April 4, 1961     M. P. SIEDBAND     2,978,629
RESIDUAL VOLTAGE REACTOR CIRCUITS
Filed Feb. 21, 1957
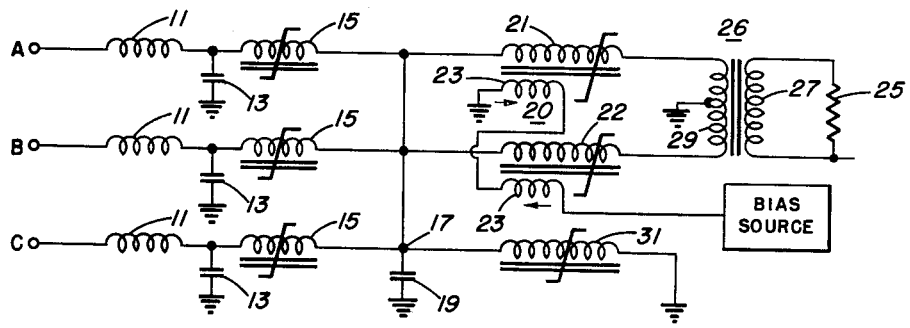
*FIG. 1*
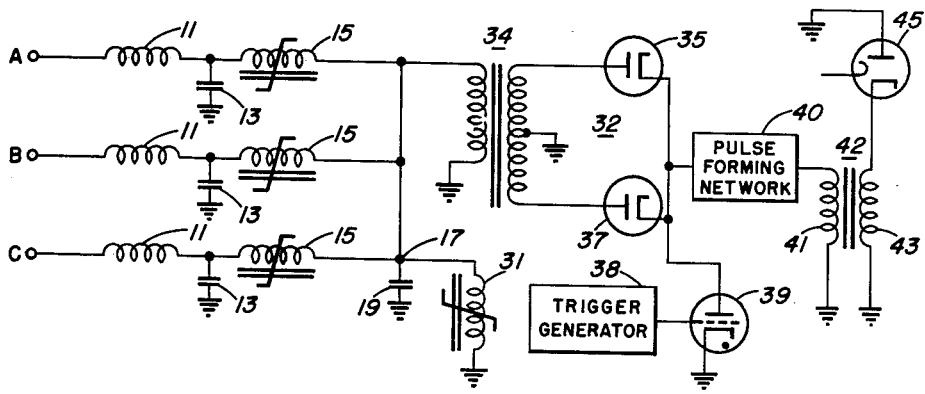
*FIG. 2*
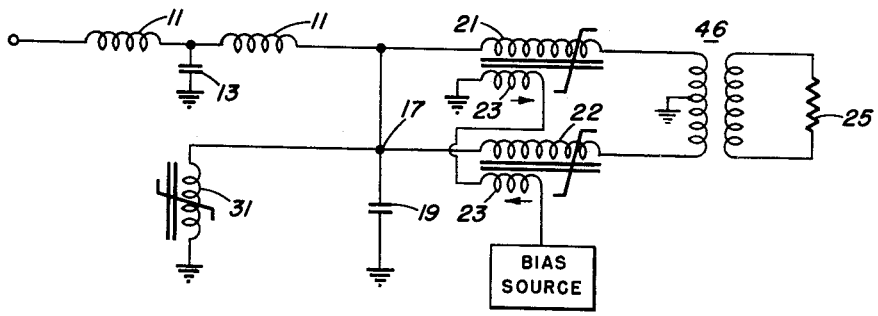
*FIG. 3*
INVENTOR.
MELVIN P. SIEDBAND
BY 
ATTORNEYS United States Patent Office 2,978,629
Patented Apr. 4, 1961

2,978,629

RESIDUAL VOLTAGE REACTOR CIRCUITS

Melvin P. Siedband, Baltimore, Md., assignor, by mesne assignments, to the United States of America as represented by the Secretary of the Navy Filed Feb. 21, 1957, Ser. No. 641,773

1 Claim. (Cl. 321—69)

The present invention relates to residual voltage reactor circuits and more particularly to the stable operation of residual voltage reactor circuits despite load impedance variations.

In frequency multiplying systems utilizing saturable reactors and charging capacitors, a change in load impedance or a change in the characteristics of the reactors will leave a voltage on the charging capacitors, the polarity of which depends on whether the net load impedance is above or below the optimum value. With each cycle of operation, the charge on any capacitor will be different from the value which it had on the previous cycle, and thus, the timing of the discharge reactors will be different and the circuit of no value. When the load and reactors are adjusted such that each capacitor discharges to zero or at least to the same potential, each cycle, the system is stable. Since the load cannot be easily controlled, in the present invention, the residual voltage on the capacitors is controlled.

Accordingly, an object of the present invention is to provide for the stable operation of a frequency multiplier in spite of load impedance changes.

Another object is to provide a saturable core reactor in combination with other saturable core circuit elements which will control the residual voltage on the capacitors of a frequency multiplying circuit.

A further object of the invention is to provide for the stable operation of a hybrid magnetic-electronic radar modulator by the provision of a saturable reactor shunted across the charging capacitor.

Other objects and many of the attendant advantages of this invention will be readily appreciated as the same becomes better understood by reference to the following detailed description when considered in connection with the accompanying drawings wherein:

Fig. 1 shows a circuit diagram of a frequency sextupling circuit in combination with a voltage residual reactor.

Fig. 2 shows a circuit diagram of a frequency-phase-converter in combination with a voltage residual reactor and a hybrid magnetic-electronic modulator.

Fig. 3 shows a circuit diagram of a stabilized frequency doubler in conjunction with a voltage residual reactor.

Referring now to the drawings, wherein like reference characters designate like or corresponding parts throughout the several views, there is shown in Fig. 1 a frequency-phase converter having inputs A, B, and C from a three-phase line. Each phase contains a resonant circuit comprising inductor 11 and capacitor 13 and a series saturable core reactor 15. The outputs of all three phases are connected to one terminal 17 of a capacitor 19, the other terminal being connected to ground. Also connected to the output is a bi-phase saturable reactor 20 having load windings 21, 22 and bias windings 23. Bias windings 23 are connected to a bias source. The output of the saturable reactor 20 is coupled to a load impedance 25 through a transformer 26 having a secondary winding 27 and a center-tapped primary winding 29. The center tap of winding 29 is connected to ground. A saturable core reactor 31 is connected between terminal 17 and ground.

The load impedance is deliberately chosen so that at its lowest value due to temperature changes, for example, it is slightly above the optimum value. Thus, when reactor 31 is shunted across capacitor 19, and when load winding 21 or 22 discharges capacitor 19, the residual voltage on 19 is of the same polarity as the initial stored voltage and at a level between one percent and twenty percent of the stored voltage. Since twenty percent of the voltage represents only four percent of the energy, the energy loss because of the use of reactor 31 is insignificant. After winding 21 or 22 saturates, i.e., reactors 21 and 22 are biased as shown by the arrows so that winding 21 will saturate on the positive going signal and winding 22 will saturate on the negative going signal that appears across capacitor 19, reactor 31 will saturate. This provides a low impedance so the residual voltage on capacitor 19 is shorted to ground.

Another important effect occurs: Assume reactor 15 has discharged the energy of capacitor 13 (phase A) into capacitor 19 and load winding 21 has just discharged capacitor 19. A residual voltage will exist on both capacitors 13 and 19 and winding 21 will remain just in the saturated condition so that when reactor 31 saturates the energy remaining on both capacitors 13 and 19 will be discharged to ground, the energy on capacitor 13 will be conducted through reactor 15. If reactor 31 has a very low winding resistance, the residual energy on 13 will be reversed in polarity. It cannot reverse again for this would imply a current reversal through reactor 15 which would pull it out of saturation. The same occurs for each of phases B and C and for voltages of either polarity since the reactor 31 is not biased. Thus, the circuit will remain stable since each cycle starts with the same capacitor voltage for each of the several capacitors.

In Fig. 2 the output of the frequency-phase converter of Fig. 1 is shown connected to a full wave rectifier circuit 32 having a transformer 34 and diodes 35, 37. The output of the rectifier is connected to ground through a thyratron tube 39 and also through a pulse forming network 40 and the primary winding 41 of a transformer 42. Thyratron 39 is triggered by a trigger generator 38 which may be of any well known type. The secondary 43 of transformer 42 is joined to a magnetron 45.

In operation, stable operation of the modulator is maintained since each cycle starts with the same voltage on capacitor 19 as the impedance of the modulator circuit changes.

Fig. 3 shows the invention applied to a frequency doubler circuit. The circuit operates in the same manner as the circuit of Fig. 1. The output of the bi-phase saturable reactor is coupled to a load 25 through the transformer 46 which has a center-tapped primary, as shown in Fig. 3.

Obviously many modifications and variations of the present invention are possible in the light of the above teachings. It is therefore to be understood that within the scope of the appended claim the invention may be practiced otherwise than as specifically described.

What is claimed is:

A frequency converter having input terminal means adapted to be connected to a source of alternating current and having output terminal means, a capacitor having a first plate connected to said output terminal means and having a second plate connected to ground, a saturable core reactor having a first terminal connected to said first capacitor plate and a second terminal connected to ground, a saturable reactor means having load windings and bias windings, said load windings having first terminals connected to said frequency converter output terminal means, said load windings having second terminals coupled to a load means, said capacitor being charged by said frequency converter and partially discharged by said saturable reactor means, said saturable core reactor saturating in time sequence after said saturable reactor means saturates to thereby completely discharge said capacitor.

References Cited in the file of this patent

UNITED STATES PATENTS

| Re. 18,855 | Flehr | June 6, 1933 |
| 2,437,093 | Huge | Mar. 2, 1948 |
| 2,451,189 | Alexanderson et al. | Oct. 12, 1948 |
| 2,727,159 | Sunderlin | Dec. 13, 1955 |
| 2,827,570 | Lynn | Mar. 18, 1958 |